United States Patent
Atchison

(10) Patent No.: US 7,092,153 B1
(45) Date of Patent: Aug. 15, 2006

(54) TEMPERATURE-CONTROLLED GAS MICROSCOPE

(75) Inventor: Nickey Joe Atchison, Santa Cruz, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 4 days.

(21) Appl. No.: 10/256,831

(22) Filed: Sep. 27, 2002

(51) Int. Cl.
*G02B 21/26* (2006.01)
*G02B 21/00* (2006.01)

(52) U.S. Cl. ................ 359/395; 359/368; 359/380
(58) Field of Classification Search ........... 359/395, 359/368, 379, 380, 382–384
See application file for complete search history.

(56) References Cited

U.S. PATENT DOCUMENTS

| | | | |
|---|---|---|---|
| 1,161,556 A | 11/1915 | Watkins | |
| 2,077,809 A | 4/1937 | Riepert | 88/24 |
| 2,351,753 A | 6/1944 | Flint et al. | 95/42 |
| 3,610,750 A | 10/1971 | Lewis et al. | 355/43 |
| 4,018,505 A | 4/1977 | Peck | 350/39 |
| 4,431,276 A | 2/1984 | Weber | 350/529 |
| 4,625,677 A * | 12/1986 | Neher | 118/713 |
| 5,671,085 A | 9/1997 | Gustafsson et al. | 359/385 |
| 5,880,465 A | 3/1999 | Boettner et al. | 250/234 |
| 6,005,709 A | 12/1999 | Silver | 359/368 |
| 6,094,299 A | 7/2000 | Schau et al. | 359/383 |
| 6,124,144 A * | 9/2000 | Watanabe | 438/18 |
| 6,128,127 A | 10/2000 | Kusaka | 359/371 |
| 6,215,586 B1 | 4/2001 | Clark | 359/363 |
| 6,233,093 B1 * | 5/2001 | Arnold et al. | 359/395 |
| 6,493,135 B1 * | 12/2002 | Engelhardt | 359/395 |
| 6,563,586 B1 | 5/2003 | Stanke et al. | 356/445 |

FOREIGN PATENT DOCUMENTS

JP         10-267943      * 10/1998

* cited by examiner

Primary Examiner—Drew A. Dunn
Assistant Examiner—Joshua L Pritchett
(74) Attorney, Agent, or Firm—David R. Graham

(57) ABSTRACT

The invention enables construction of a microscope that has one or more advantageous characteristics as compared to previous microscopes. The microscope can be small and lightweight and, in particular, sufficiently small and light weight to be portable (e.g., smaller and far lighter than probe station microscopes used for microscopic liquid crystal analysis of a semiconductor device). The microscope can include a small and lightweight bellows that provides zoom capability. The microscope and/or a tripod that is used with the microscope can be implemented to provide objective lens position control capability (with any number of translational and/or rotational degrees of freedom). The microscope can include apparatus for ejecting a hot gas from the microscope to heat a specimen being observed with the microscope.

21 Claims, 5 Drawing Sheets

TEMPERATURE-CONTROLLED GAS MICROSCOPE

BACKGROUND OF THE INVENTION

1. Field of the Invention

This invention relates to a microscope and, in articular, to a zoom capability, specimen heating capability and objective lens positioning capability of a microscope. The invention further relates to the use of a microscope for liquid crystal analysis of a semiconductor device and, in particular, to a microscope for such use that is portable.

2. Related Art

Microscopic liquid crystal analysis is sometimes used to perform failure analysis of semiconductor devices. Previously, microscopic liquid crystal analysis of semiconductor devices has been performed using large, bulky, heavy microscopes. For example, large probe station microscopes (such as made by SUSS MicroTec, located in Waterbury, Vt. and headquartered in Munich, Germany, or by Signatone Corporation located in Gilroy, Calif.) that have been used for microscopic liquid crystal analysis of semiconductor devices have weighed between 500 and 1500 pounds. The microscopes previously used for microscopic liquid crystal analysis of semiconductor devices cannot be moved easily or at all. For example, it is typically not feasible to transport a liquid crystal analysis microscope to a location that is geographically remote from that at which the microscope is usually located (because, for example, such microscopes are too large and heavy to be transported as luggage on a commercial airliner), making a field visit to a distant location impractical. Even when it is possible to move a liquid crystal analysis microscope, special equipment and/or packaging is required to transport the microscope, making transportation of the microscope unduly expensive and time consuming. Consequently, the performance of microscopic liquid crystal analysis of a semiconductor device has necessitated that the semiconductor device be transported to the location of the microscope to be used to perform the analysis. This can be disadvantageous. For example, this can preclude analysis of a semiconductor device together with a system of which the semiconductor device is part. Analyzing a semiconductor device apart from a system of which the semiconductor device is part may result in an inability to reproduce a problem that instigated the analysis of the semiconductor device and/or may inhibit the ability to test solutions to problems with operation of the semiconductor device. Additionally, transporting a semiconductor device to the location of an analysis microscope may be inconvenient, impractical, unduly time consuming and/or impossible.

It is sometimes desirable for a microscope to have a zoom capability (i.e., the capability of continuously changing the microscope magnification over a range of magnifications). The structure used in previous microscopes to provide zoom capability can be undesirable in some respects. For example, zoom capability is provided in some microscopes by a zoom lens that is positioned in a microscope body in the optical path of the microscope (e.g., between the eyepiece and a fixed objective lens) and coupled to a system of gears and knobs that enable the zoom lens to be moved with respect to the microscope body, thereby enabling continuous change in the microscope magnification. Such structure can be undesirably expensive. Such structure may also not enable as wide a range of magnifications as desired (e.g., a highest magnification that is two or more times the lowest magnification). Further, the structure previously used for providing zoom capability in microscopes has been undesirably heavy. For example, to maintain a stable optical path, the zoom apparatus of previous microscopes can include a heavy (e.g., about 3 pounds) steel tube which housed mechanical gear apparatus and a knob. Additionally, for microscopes including multiple objective lenses, providing zoom capability for the entire range of magnification of the microscope requires that each of the objective lenses be optically matched to the zoom apparatus, which can increase the complexity and cost of constructing the microscope. Moreover, microscopes including multiple objective lenses have not provided continuous zoom capability over the entire magnification range of the objective lenses.

During operation of a microscope, it is sometimes necessary to adjust the relative positions of a specimen and the objective lens being used to observe the specimen in order to facilitate, enable or improve observation of the specimen. This has been accomplished by providing a movable stage on which the specimen is mounted, thereby enabling the specimen to be moved as necessary to achieve an appropriate relative position of the specimen and objective lens. Since the specimen must be mounted on the microscope stage, the specimen cannot be observed while positioned in the environment in which the specimen normally exists. This can be disadvantageous in some applications. For example, in performing microscopic liquid crystal analysis of a semiconductor device, it can be desirable (for both problem diagnosis and solution) to observe the semiconductor device as the semiconductor device operates in an electronic system of which the semiconductor device is part. However, this is infeasible or impossible when the semiconductor device must be mounted on a microscope stage.

It can be desirable in some situations to control the temperature of a specimen during analysis of the specimen with a microscope. For example, the sensitivity of microscopic liquid crystal analysis of a semiconductor device can be increased by heating the semiconductor device. Previously, such heating has been accomplished using a radiant heating wire located under the semiconductor device (i.e., on the side of the semiconductor device opposite that being observed with the microscope).

SUMMARY OF THE INVENTION

According to the invention, a microscope can be constructed that has one or more advantageous characteristics as compared to previous microscopes. The invention enables construction of a small and lightweight microscope by, for example, implementing aspects of microscope functionality in smaller and lighter apparatus than that used in previous microscopes, combining multiple aspects of microscope functionality into a single apparatus, and eliminating apparatus found in previous microscopes. In particular, the invention enables construction of a microscope for use in microscopic liquid crystal analysis of semiconductor devices that is smaller and far lighter than microscopes (e.g., probe station microscopes) previously used for such analysis. For example, a microscope according to the invention can include a lightweight bellows that provides zoom capability (in particular, the bellows can be much lighter than the structure provided to produce zoom capability in microscopes previously used for microscopic liquid crystal analysis of semiconductor devices). Further, the light weight and small size of a microscope according to the invention advantageously enables the microscope to be portable. In particular, a microscope according to the invention can be made sufficiently small and lightweight to enable the microscope to be easily transported to a location of a specimen to be observed with the microscope. This can advantageously enable the specimen to be observed with the microscope while the specimen is positioned in the environment in which the specimen normally exists (e.g., to analyze operation of a semiconductor chip connected to a printed circuit board with other electronic components). Another advantageous characteristic of the invention is that a microscope according to the invention and/or a tripod that is used with the microscope can be implemented to provide objective lens position control capability (with any number of translational and/or rotational degrees of freedom). Consequently, it is not necessary to provide a movable stage for mounting the specimen, since the objective lens can be moved to achieve a desired relative position of the specimen and objective lens. This aspect of the invention also enables a specimen to be observed while positioned in the environment in which the specimen normally exists, since the specimen need not be mounted on a movable stage. A microscope according to the invention can also include apparatus for ejecting a temperature-controlled gas (heated gas or refrigerated gas) from the microscope to control the temperature of a specimen being observed with the microscope. This can advantageously increase the sensitivity of observation of the specimen. This can also advantageously inhibit impairment of the analysis that would otherwise occur without controlling the temperature of the specimen.

In one embodiment of the invention, a microscope includes: 1) an objective lens positioned proximate to a specimen, 2) optical apparatus for transmitting light to the specimen and for transmitting light reflected from the specimen through the objective tens, 3) viewing apparatus for viewing a magnified image of the specimen produced from the reflected light, and 4) a bellows positioned between the objective lens and an image formation plane of the viewing apparatus. At least one of the objective lens and the image formation plane of the viewing apparatus is movable in response to expansion or contraction of the bellows to vary the distance between the objective lens and the image formation plane of the viewing apparatus and thereby change the magnification of the magnified image. The bellows advantageously provides zoom capability using small and lightweight apparatus. The small and lightweight bellows can also eliminate the need to provide a heavy microscope body. A microscope according to this embodiment of the invention can further include bellows control apparatus for effecting expansion or contraction of the bellows. The bellows control apparatus can be implemented by 1) a bellows slide attached to a first end of the bellows, 2) a bellows slide bar which remains fixed in position relative to a second end of the bellows opposite the first end of the bellows, and 3) a bellows slide location control knob that can be moved to move the bellows slide along the bellows slide bar to expand or contract the bellows. The viewing apparatus can be implemented by a visual image data acquisition apparatus (e.g., a video camera) and can further include a display device operably connected to the visual image data acquisition apparatus to enable data acquired by the visual image data acquisition apparatus to be transmitted to the display device for generation of a display of the magnified image of the specimen. The viewing apparatus can also be implemented by an eyepiece. The microscope can include multiple objective lenses which can be formed on, or attached to, a rotatable turret. The optical apparatus can be implemented by a light source and a beam splitter for directing light from the light source toward the objective lens. The microscope can also include a polarizing filter for controlling the polarity of the light. The microscope can also include a fiberoptic cable for transmitting light from the light source to the beam splitter. The microscope can also include an objective lens position control apparatus, which can be implemented to effect translational and/or rotational position control. The microscope can also include gas ejection apparatus (e.g., a gas outlet port formed in the objective lens or a gas outlet pipe positioned proximate to the objective lens) for ejecting a temperature-controlled gas on to the specimen.

In another embodiment of the invention, a microscope includes: 1) an objective lens positioned proximate to a specimen, 2) optical apparatus for transmitting light to the specimen and for transmitting light reflected from the specimen through the objective lens, 3) viewing apparatus for viewing a magnified image of the specimen produced from the reflected light, and 4) gas ejection apparatus for ejecting a temperature-controlled gas on to the specimen. For example, a heated gas can be used to heat the specimen during observation of the specimen with the microscope. This can be useful, for example, to advantageously increase the sensitivity of observation of the specimen (e.g., sensitivity of microscopic liquid crystal analysis of a semiconductor device). Or, for example, a refrigerated gas can be used to cool the specimen during observation of the specimen with the microscope. This can advantageously inhibit impairment of infrared analysis that would otherwise occur from heating of the specimen. The gas ejection apparatus can be implemented using one or more gas outlet ports formed in an objective lens of the microscope, or, if the microscope includes multiple objective lenses (which can be formed on, or attached to, a rotatable turret), in each of multiple objective lenses of the microscope. The gas ejection apparatus can also be implemented using one or more gas outlet pipes positioned proximate to an objective lens of the microscope, or, if the microscope includes multiple objective lenses (which can be formed on, or attached to, a rotatable turret), positioned proximate to each of multiple objective lenses of the microscope. The gas ejection apparatus can be implemented so that the total cross-sectional area of the gas outlet ports for, or the gas outlet pipes positioned proximate to, each objective lens is the same or approximately the same as the cross-sectional area of the gas outlet ports for, or the gas outlet pipes positioned proximate to, each other objective lens. The gas ejection apparatus can be implemented so that the gas outlet ports of, or the gas outlet pipes positioned proximate to, each objective lens are positioned, for the same zoom position, at the same or approximately the same distance from a specimen as the gas outlet ports of, or the gas outlet pipes positioned proximate to, each other objective lens. A microscope according to this embodiment of the invention can also be implemented to include objective lens position control apparatus, which can be implemented to effect translational and/or rotational position control.

In yet another embodiment of the invention, a microscope includes: 1) an objective lens positioned proximate to a specimen, 2) optical apparatus for transmitting light to the specimen and for transmitting light reflected from the specimen through the objective lens; 3) viewing apparatus for viewing a magnified image of the specimen produced from the reflected light, and 4) objective lens position control apparatus for moving the location of the objective lens to a desired location relative to the specimen. The objective lens position control apparatus advantageously enables the relative position of the specimen and objective lens to be controlled without need to provide a microscope stage on which to mount the specimen. Thus, the specimen can be observed in an environment in which the specimen is used. Elimination of the microscope stage can also make the microscope smaller and lighter. In particular implementations of a microscope according to this embodiment of the invention, the objective lens position control apparatus can enable translational position control (objective lens longitudinal location control, objective lens lateral location control and/or objective lens height control). In other particular implementations of a microscope according to this embodiment of the invention, the objective lens position control apparatus can enable, alternatively or additionally, rotational position control (objective lens lateral tilt control, objective lens longitudinal tilt control and/or objective lens pan control). In general, a microscope according to this embodiment of the invention can be implemented to include a single type of translational or rotational position control, or any combination of types of translational and/or rotational position control.

DETAILED DESCRIPTION OF THE INVENTION

Figure 1:
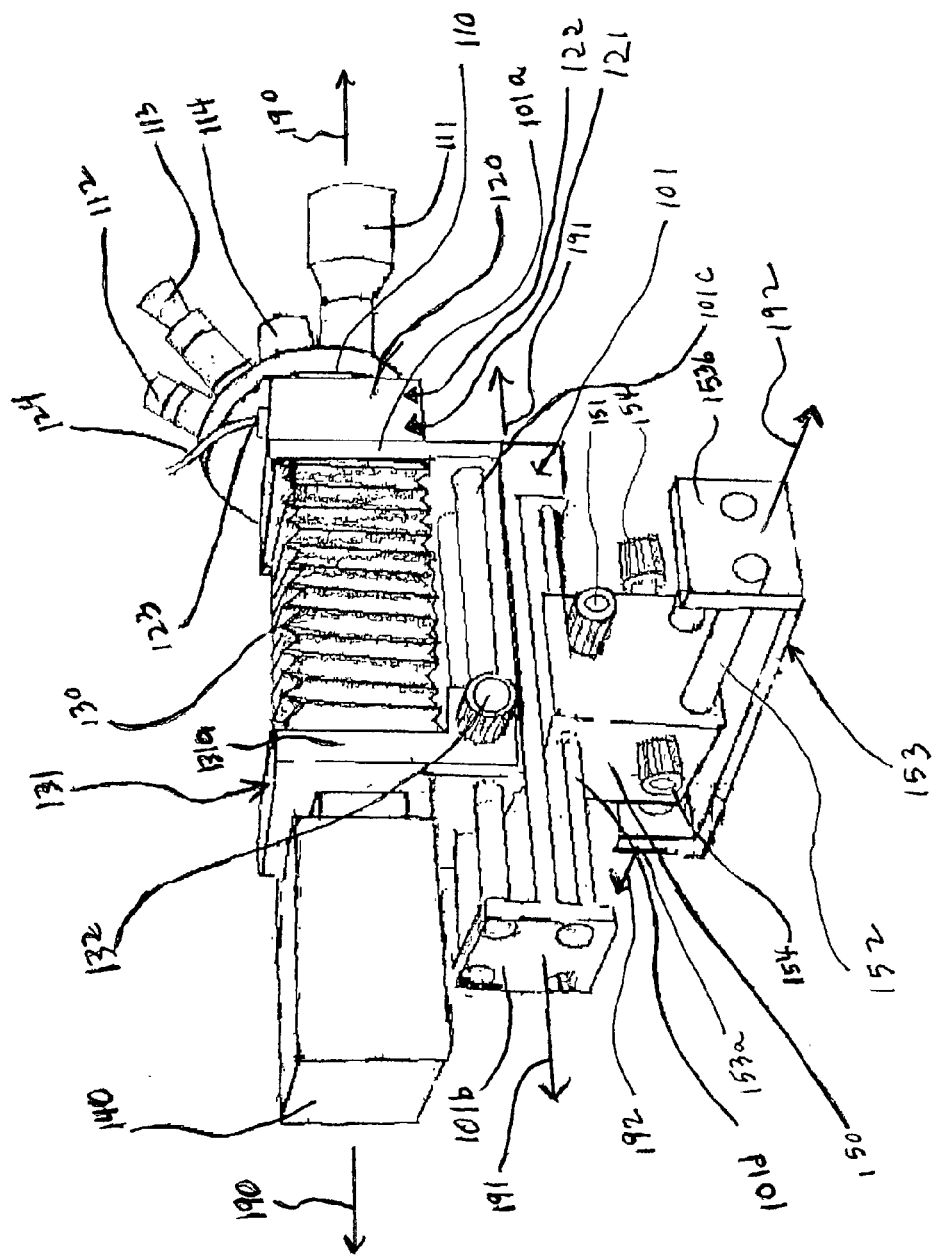
FIG. 1 is a perspective view of a microscope according to an embodiment of the invention.

FIG. 1 is a perspective view of a microscope 100 according to an embodiment of the invention. Four objective lenses 111, 112, 113 and 114 are mounted on a turret 110. Though the microscope 100 illustrated in FIG. 1 (and FIG. 2, described below) includes four objective lenses, generally a microscope according to the invention can include any number of objective lenses (i.e., one, two or more objective lenses). An objective lens of a microscope according to the invention can be attached to a turret (or other support structure) of the microscope using any of a variety of appropriate techniques and/or apparatus, as can be readily appreciated by those skilled in the art. For example, an objective lens of a microscope according to the invention can be constructed with a base having a threaded section that screws into a corresponding threaded hole of a turret or other support structure of the microscope (see, e.g., the objective lens 500 illustrated in FIG. 5 and described below). In general, each objective lens of a microscope according to the invention can be any type of objective lens (and any particular instantiation of a type of objective lens) that is compatible with other characteristics of the microscope (e.g., other optical characteristics of the microscope). Further, any combination of types of objective lenses can be used together in a microscope according to the invention. For example, a microscope according to the invention can include objective lenses having different powers of magnification. A microscope according to the invention can also include objective lenses having different fields of view, e.g., a wide angle objective lens in addition to one or more objective lenses having a standard size field of view. In a particular embodiment of the microscope 100 illustrated in FIG. 1, the objective lens 111 is a 10× magnification objective lens (e.g., a long standoff 50× microscope objective lens), the objective lens 112 is a 50× magnification objective lens (e.g., a long standoff 50× microscope objective lens), the objective lens 113 is a 100× magnification objective lens (e.g., a long standoff 100× microscope objective lens), and the objective lens 114 is a wide angle objective lens (e.g., a wide angle lens providing conventional 16 mm video capability).

The turret 110 of the microscope 100 is rotatably attached to a housing 120 so that the turret 110 can be rotated to place a particular one of the objective lenses 111, 112, 113 or 114 in position for use in observing a specimen (not shown in FIG. 1, or in FIG. 2, described below) with the microscope 100. The rotatable attachment of a lens turret of a microscope according to the invention to a housing of the microscope can be accomplished using any of a variety of appropriate techniques and/or apparatus, as can be readily appreciated by those skilled in the art. The apparatus for rotatably attaching the lens turret to the housing includes a mechanism or mechanisms (e.g., detent mechanisms) for stably holding each objective lens in place when rotated into position for observing a specimen (e.g., detent mechanisms). A microscope according to the invention can include a motor for effecting rotation of a rotatable lens turret. Embodiments of a microscope according to the invention including a single objective lens can be constructed without a rotatable turret.

Optical apparatus of the microscope 100 is positioned in the housing 120. As illustrated in FIG. 1 (and FIG. 2, described below), a beam splitter 121 and a polarizing filter 122 are positioned in the housing 120. (The beam splitter 121 and the polarizing filter 122 are not visible in FIGS. 1 and 2; however, the locations of the beam splitter 121 and polarizing filter 122 in the housing 120 are indicated generally in FIGS. 1 and 2.) A fiberoptic cable connector 123 is attached to the housing 120. The fiberoptic cable connector 123 guides a fiberoptic cable 124 into the housing 120 so that the fiberoptic cable 124 conducts light from a light source (any of a variety of appropriate light sources can be used, as known to those skilled in the art) to the beam splitter 121, which, in turn, guides the light to the specimen being observed with the microscope 100. The polarizing filter 122 is used to control (as known to those skilled in the art) the polarity of the light reflected from the specimen that can pass through the polarizing filter 122 as that light travels back through the microscope 100 to a viewing apparatus (discussed further below) of the microscope 100. (This can be used, for example, as known to those skilled in the art, to facilitate discrimination among different temperatures of region(s) of a semiconductor die, which can facilitate the identification of defects on the die.) The optical apparatus of a microscope according to the invention (e.g., beam splitter 121, polarizing filter 122, fiberoptic cable 123 and fiberoptic cable connector 124) can be implemented by conventional such apparatus and operated in a conventional manner, as known to those skilled in the art. Further, the optical apparatus of a microscope according to the invention can be positioned in and/or attached to the microscope using any of a variety of appropriate techniques and/or apparatus, as can be readily appreciated by those skilled in the art.

The housing 120 is attached to one side of a flange 101a of a frame 101. One end of a bellows 130 is attached to the side of the flange 101a opposite that to which the housing 120 is attached. The bellows 130 is constructed of a material (e.g., a light fabric, such as that used in a camera bellows) and in a manner that enables the bellows 130 to expand and contract in length (i.e., along an axis 190 shown in FIGS. 1 and 2). For example, the bellows 130 can be constructed using a set of concentric plastic or metal tubes. The housing 120 and bellows 130 can be attached to the flange 101a using any of a variety of appropriate techniques and/or apparatus, as can be readily appreciated by those skilled in the art. A hole is formed through the flange 101a to join the space within the bellows 130 and the space within the housing 120.

The end of the bellows 130 opposite the end attached to the flange 101a is attached to a side of a flange 131a of a bellows slide 131. A video camera 140 is attached to the side of the flange, 131a opposite that to which the bellows 130 is attached. The bellows 130 and video camera 140 can be attached to the flange 131a using any of a variety of appropriate techniques and/or apparatus, as can be readily appreciated by those skilled in the art. A hole is formed through the flange 131a to join the space within the bellows 130 and the interior of the video camera 140.

A microscope according to the invention need not necessarily include a bellows. For instance, the microscope 100 could be modified so that the bellows 130 is eliminated and the video camera 140 is attached directly to the housing 120. This could be done, for example, by lengthening the housing 120 to extend to the video camera 140, or by shortening the length of the frame 101 (including the longitudinal location slide bars 101d, described below). In addition to the bellows 130, the bellows slide 131, bellows slide bars 101c (described below) and bellows slide location control knobs 132 (described below) would also be eliminated from the microscope 100. As described elsewhere herein, a bellows can advantageously be used to provide zoom capability in a microscope according to the invention. However, in some embodiments of a microscope according to the invention, the microscope does not include zoom capability. In other embodiments of a microscope according to the invention, zoom capability is provided in another way, e.g., by using one or more zoom lenses.

Figure 2:
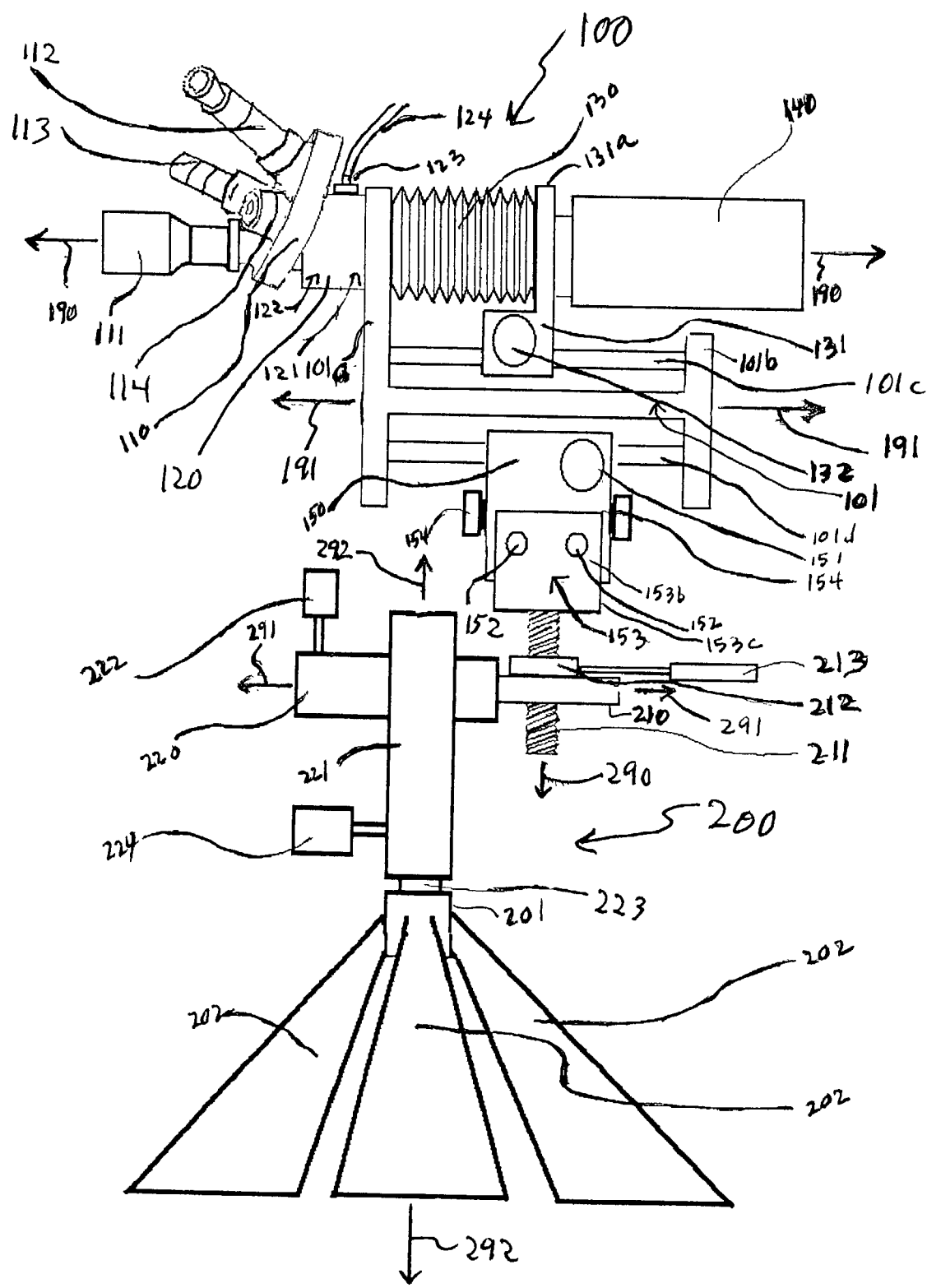
FIG. 2 is a side view of the microscope of FIG. 1 mounted on a tripod.

The video camera 140 acquires data representing one or more images of a specimen being observed with the microscope 100, which data can then be used to generate a display of the image(s) on a display device (not shown in FIGS. 1 and 2). Any of a variety of video cameras (or other visual image data acquisition apparatus) can be used with a microscope according to the invention, as can readily be appreciated by those skilled in the art. For example, the video camera 140 can be implemented using any conventional professional video camera (such as those made by Sony or Panasonic), as known to those skilled in the art. In particular, the video camera 140 can advantageously be implemented using a very lightweight camera (e.g., a camera weighing about 1 pound), such as, for example, the Pulnix or Edmund Scientific Wireless Video Camera having stock number CR31226 or the Edmund Scientific Boreal VideoSkope camera having stock number CR30951-00. It is desirable to use a video camera (or other visual image data acquisition apparatus) having a relatively high image resolution (e.g., image resolution of 640×480 with 24 bit color capability), such as an image resolution that matches the image resolution of high resolution portable laptop computer display screens (e.g., 1024×780 pixels) or an image resolution corresponding to high definition video (e.g., approximately 2000×1000 pixels). It is also desirable (to reduce or eliminate the influence of any vibration in or near the microscope 100) to use a video camera (or other visual image data acquisition apparatus) having image stabilization capability, such as is present in a variety of commercially available video cameras. Any of a variety of visual image display devices (e.g., conventional computer display monitor, television, high definition video projector, virtual reality headset) can be used to display the image(s) acquired by the video camera 140 (or other visual image data acquisition apparatus), as can readily be appreciated by those skilled in the art. Though the microscope 100 is illustrated with a visual image data acquisition apparatus (video camera 140) and associated display device used to implement a viewing apparatus for viewing a magnified image of a specimen, those skilled in the art will appreciate that a microscope according to the invention (including the microscope 100) can be implemented so that other types of viewing apparatus are used (in addition to, or instead of, the visual image data acquisition apparatus and display device), such as a conventional microscope eyepiece.

Two parallel bellows slide bars 101c extend between the flange 101a of the frame 101 and a flange 101b of the frame 101. The bellows slide bars 101c pass through corresponding holes in the bellows slide 131 such that the bellows slide 131 can be moved along the bellows slide bars 101c. Bellows slide location control knobs 132 (only one is visible in FIG. 1; the other is visible in FIG. 2) are formed on opposite sides of the bellows slide 131. The bellows slide location control knobs 132 can be used to move the bellows slide 131 along the bellows slide bars 101c (i.e., along the direction of the axis 190, which is parallel to the bellows slide bars 101c), enabling the bellows slide 131 to be positioned at any location along the bellows slide bars 101c (limited only by the maximum extension and compression of the bellows 130), thereby enabling the location of the video camera 140 relative to the objective lenses 111, 112, 113 and 114 and other optical apparatus of the microscope 100 to be continuously varied and, as a result, the magnification of the microscope 100 to be continuously varied, as described further below. The bellows slide 131, bellows slide bars 101c and bellows slide location control knobs 132 together comprise bellows control apparatus.

Two parallel longitudinal location slide bars 101d (only one is visible in FIG. 1; the other is visible in FIG. 2) also extend between the flanges 101a and 101b of the frame 101. The longitudinal location slide bars 101d pass through corresponding holes in a lateral location slide 150 such that the longitudinal location slide bars 101d (and thus the frame 101) can be moved with respect to the lateral location slide 150 along an axis 191 (which is parallel to the axis 190) shown in FIGS. 1 and 2. Longitudinal location control knobs 151 (only one is visible in FIG. 1; the other is visible in FIG. 2) are formed on opposite sides of the lateral location slide 150. The longitudinal location control knobs 151 can be rotated to drive a system of gears (not visible in FIGS. 1 and 2) so that the longitudinal location slide bars 101d move with respect to the lateral location slide 150 along the axis 191, enabling the frame 101 to be positioned at any location with respect to the lateral location slide 150 (limited only by the flanges 101a and 101b of the frame 101), thereby enabling the location of an operable one of the objective lenses 111, 112, 113 and 114 with respect to a specimen being observed with the microscope 100 to be continuously varied, as necessary or desirable, along the axis 191 (i.e., the operable one of the objective lenses 111, 112, 113 and 114 can be moved closer to, or farther from, the specimen): The longitudinal location slide bars 101d, lateral location slide 150 and longitudinal location control knobs 151 together comprise objective lens position control apparatus: in particular, objective lens translational position control apparatus and, even more particularly, objective lens longitudinal location control apparatus. A microscope according to the invention need not necessarily include objective lens longitudinal location control apparatus: such position control can be provided as part of a tripod on which the microscope is to be mounted or need not be provided at all.

Two parallel lateral location slide bars 152 extend between a flange 153a and a flange 153b of a frame 153. The lateral location slide bars 152 pass through corresponding holes in the lateral location slide 150 such that the lateral location slide 150 can be moved along the lateral location slide bars 152. Lateral location control knobs 154 are formed on opposite sides of the lateral location slide 150. The lateral location control knobs 154 can be used to move the lateral location slide 150 along the lateral location slide bars 152 (i.e., along the direction of an axis 192, which is parallel to the lateral location slide bars 152), enabling the lateral location slide 150 to be positioned at any location along the lateral location slide bars 152 (limited only by the flanges 153a and 153b of the frame 153), thereby enabling the location of an operable one of the objective lenses 111, 112, 113 and 114 with respect to a specimen being observed with the microscope 100 to be continuously varied, as necessary or desirable, along the axis 192. The lateral location slide bars 152, lateral location slide 150 and lateral location control knobs 154 together comprise objective lens position control apparatus: in particular, objective lens translational position control apparatus and, even more particularly, objective lens lateral location control apparatus. A microscope according to the invention need not necessarily include objective lens lateral location control apparatus: such position control can be provided as part of a tripod on which the microscope is to be mounted or need not be provided at all.

As discussed elsewhere herein, an advantageous characteristic of a microscope according to the invention is that the microscope can be lightweight. To this end, components of a microscope according to the invention (e.g., frame 101, turret 110, housing 120, bellows slide 131, bellows slide location control knobs 132, lateral location slide 150, longitudinal location control knobs 151, lateral location slide bars 152, frame 153, and/or lateral location control knobs 154) can be constructed from a strong light metal such as aluminum or a strong light plastic.

FIG. 2 is a side view of the microscope 100 of FIG. 1 mounted on a tripod 200, showing the side of the microscope 100 opposite that shown in FIG. 1. The tripod 200 is constructed to enable movement of the microscope 100 (and, in particular, the objective lens 111, 112, 113 and 114) with respect to a specimen being observed with the microscope 100, as described in more detail below. Though a tripod is illustrated and described herein as an apparatus for supporting a microscope according to the invention, any apparatus that provides a stable support for the microscope can be used.

The tripod 200 includes a base 201 which is supported by three legs 202, providing a stable support structure for the microscope 100. A tripod for use with a microscope according to the invention can have more than three legs. The base 201 and legs 202 can be implemented by conventional such apparatus, as known to those skilled in the art, such as would be adequate to support a large camera.

A threaded rod 211 extends from a surface 153c of the frame 153 through a hole formed in a table 210. A height adjustment nut 212 is screwed onto the rod 211 above the table 210 so that the height adjustment nut 212 contacts a surface of the table 210. A height adjustment control handle 213 extends from the height adjustment nut 212. The height adjustment control handle 213 can be moved to rotate about the threaded rod 211 (i.e., rotate about an axis 290 shown in FIG. 2). Such rotation of the height adjustment control handle 213 changes the location of the height adjustment nut 212 along the threaded rod 211 (i.e., along the axis 290), thereby enabling the location of an operable one of the objective lenses 111, 112, 113 and 114 with respect to a specimen being observed with the microscope 100 to be continuously varied, as necessary or desirable, along the axis 290 (since the location of the height adjustment nut 212 is fixed with respect to the location of the table 210, and the location of the table 210—at the location of the axis 290—is fixed relative to the surface on which the tripod 200 is positioned). The threaded rod 211, height adjustment nut 212 and height adjustment control handle 213 together comprise objective lens position control apparatus: in particular, objective lens translational position control apparatus and, even more particularly, objective lens height control apparatus. A tripod for use with a microscope according to the invention need not necessarily include objective lens height control apparatus: such position control can be provided as part of the microscope or need not be provided at all.

A rotational control bearing 220 is attached to, or formed integrally with, the table 210. The rotational control bearing 220 fits through a hole formed in a support 221. A rotational control handle 222 extends from the rotational control bearing 220. The rotational control handle 222 can be moved to rotate the rotational control bearing 220 and, thus, the table 210 about an axis 291 shown in FIG. 2, thereby enabling the location of an operable one of the objective lenses 111, 112, 113 and 114 with respect to a specimen being observed with the microscope 100 to be tilted from side to side about the axis 291. The bearing 220 can be held in a desired position using, for example, a set screw (not shown in FIG. 2) that extends through a threaded hole in the support 221 and can be screwed down to make contact with the bearing 220. The rotational control bearing 220, table 210, support 221 and rotational control handle 222 together comprise objective lens position control apparatus: in particular, objective lens rotational position control apparatus and, even more particularly, objective lens lateral tilt control apparatus. A tripod for use with a microscope according to the invention need not necessarily include objective lens lateral tilt control apparatus: such position control can be provided as part of the microscope or need not be provided at all.

A pan control bearing 223 is attached to, or formed integrally with, the support 221. The pan control bearing 223 fits in a cavity or hole formed in the base 201. A pan control handle 224 extends from the support 221. The pan control handle 224 can be moved to rotate the support 221 about an axis 292 shown in FIG. 2, thereby enabling the location of an operable one of the objective lenses 111, 112, 113 and 114 with respect to a specimen being observed with the microscope 100 to be tilted about the axis 292. The pan control bearing 223, support 221 and pan control handle 224 together comprise objective lens position control apparatus: in particular, objective lens rotational position control apparatus and, even more particularly, objective lens pan control apparatus. A tripod for use with a microscope according to the invention need not necessarily include objective lens pan control apparatus: such position control can be provided as part of the microscope or need not be provided at all.

As described above, the tripod 200 includes particular structure that enables-translational movement of the microscope 100 (and, in particular, the objective lenses 111, 112, 113 and 114) along one axis and rotational movement of the microscope 100 (and, in particular, the objective lenses 111, 112, 113 and 114) about two orthogonal rotational axes, i.e., "lateral tilting" (rotation about the axis 291) and "panning" (rotation about the axis 292). The invention contemplates implementation of a tripod to enable such movement of a microscope according to the invention using structure other than the particular structure described above. Further, the invention contemplates use of a tripod that enables other combinations of degrees of freedom of positioning of a microscope according to the invention (which can include any of three translational and/or three rotational degrees of freedom of movement, including "longitudinal tilting"—another type of objective lens rotational position control, i.e., objective lens longitudinal tilt control—not implemented as part of the tripod 200 or microscope 100), a single degree of freedom of positioning of a microscope according to the invention (which can be along or about any axis), or no freedom of positioning of a microscope according to the invention (i.e., the tripod simply provides support for the microscope).

The microscope 100 can be operated to observe a specimen as follows. The microscope 100 is positioned with respect to the specimen so that the objective lenses 111, 112, 113 and 114 are sufficiently proximate to the specimen to enable the position of the objective lenses 111, 112, 113 and 114 to be further adjusted, as necessary or desirable, to enable a selected one of the objective lenses 111, 112, 113 and 114 to be used to view the specimen. The turret 110 is rotated to select a desired one of the objective lenses 111, 112, 113 or 114 to view the specimen (this can be done before or after the initial positioning of the microscope 100). The longitudinal location control knobs 151, lateral location control knobs 154 and height adjustment control handle 213 can be used to adjust the translational position of the objective lenses 111, 112, 113 and 114 in each of three orthogonal directions, and the rotational control handle 222 and the pan control handle 224 can be used to adjust the rotational position of the objective lenses 111, 112, 113 and 114 in each of two orthogonal directions, to place the selected objective lens in position to view the specimen.

A light source connected to the fiberoptic cable 124 is turned on. Light travels through the fiberoptic cable 124, is reflected off of the beam splitter 121 and passes through the polarizing filter 122 and the selected objective lens to the specimen. Light is reflected from the specimen in accordance with physical characteristics of the specimen. The reflected light travels back through the objective lens, the polarizing filter 122 and the beam splitter 121 to the video camera 140, which acquires data representing an image of the specimen. The acquired data can be stored for later use in generating a display of the image and/or immediately provided to a display device for generation of an image display.

The magnification with which a specimen is observed can be changed either by rotating the turret 110 to select a different one of the objective lenses 111, 112, 113 or 114 (if at least one other of the objective lenses 111, 112, 113 or 114 has a different magnification) or by using the bellows slide location control knobs 132 to expand or contract the bellows 130 (expanding the bellows 130 increases the magnification, while contracting the bellows 130 decreases the magnification). Selecting a different one of the objective lenses 111, 112, 113 or 114 enables a discrete change in the magnification, while using the bellows slide location control knobs 132 to expand or contract the bellows 130 enables continuous change in the magnification. The microscope 100 can be implemented, for example, so that when at least two of the objective lenses 111, 112, 113 and 114 have different magnification powers, the bellows 130 and associated bellows control apparatus are implemented so that expansion of the bellows 130 from maximum contraction to maximum expansion increases the magnification power from that of the objective lens being used up to a magnification power that is less than or equal to that of the objective lens, if any, having the next highest magnification power. The video camera 140 can continually acquire images as the bellows 130 is used to continuously increase the magnification power. Use of the microscope 100 in that manner can be used to produce a "movie" in which the view of the semiconductor device is zoomed in or out as the semiconductor device operates, e.g., the view of the semiconductor device can be zoomed in on a part of a semiconductor device at which a problem is occurring.

A microscope according to the invention can be used for a variety of applications. In particular, a microscope according to the invention can be used to perform microscopic liquid crystal analysis of a semiconductor device. A microscope according to the invention can be used to analyze operation of a semiconductor device while the semiconductor device remains assembled in a system of which the semiconductor device is part. Alternatively, the semiconductor device can be held in a special mount on a printed circuit board that can be used to hold a variety of different semiconductor devices to enable analysis with a microscope according to the invention. In either case, the protective cover of the semiconductor device is removed and a layer of temperature sensitive liquid crystal compound spread on the exposed surface of the semiconductor device (e.g., a liquid crystal compound that changes color when heated beyond a color transition temperature of, for example, about 30 degrees Celsius). Application of power to the semiconductor device causes the semiconductor device to heat up. Defects in the semiconductor device will tend to heat up more than other areas of the semiconductor device (i.e., create a "hot spot"), which will be evidenced by a change in color of the liquid crystal compound that begins at the location of a defect and gradually spreads out from that location with the continued application of power to the semiconductor device. The power to the semiconductor device is varied (e.g., turned on and off) so that the temperature of a hot spot of the semiconductor device that corresponds to a defect changes back and forth through the color transition temperature of the liquid crystal compound, causing the color and polarity of light reflected from the liquid crystal compound to change. As the power to the semiconductor device is varied, the color of light corresponding to a hot spot on the semiconductor device will appear to blink, indicating the location of a defect. The sensitivity of observation of the specimen can be enhanced by adjusting the rotation of the polarizing filter to produce maximum differentiation between temperatures, in a manner known to those skilled in the art. To focus in on the location of the defect, the microscope operator can increase the frequency with which the power is varied (which causes the blinking to become more localized and rapid) while using the microscope to zoom in on the location of the blinking. In this way, an operator can pinpoint the location of a defect in the semiconductor device. If the microscope according to the invention includes multiple objective lenses, the turret assembly can be rotated so that the lowest power objective lens with the widest field of view is first used to observe the semiconductor device. The magnification can be increased as necessary using the bellows and/or by using a new objective lens. The objective lens position control apparatus can be used to adjust the position of the objective lens being used as necessary to improve the centering of a region of the semiconductor device that exhibits a hot spot.

A particular advantage of a microscope according to the invention is that the microscope can be constructed to be smaller and far lighter than microscopes previously used for microscopic liquid crystal analysis of semiconductor devices, such as the large probe station microscopes that have been used for such analysis. The construction of a microscope according to the invention enables a drastic size and weight reduction by, for example, implementing aspects of microscope functionality in smaller and lighter apparatus than that used in previous microscopes, combining multiple aspects of microscope functionality into a single apparatus, and eliminating apparatus found in previous microscopes. For example, the heavy microscope body and, if applicable, the zoom apparatus of a probe station microscope can be replaced in a microscope according to the invention by a lightweight bellows (see, e.g., the description above of the microscope 100 and the bellows 130 of the microscope 100). Additionally, the heavy optical viewing head of a probe station microscope can be replaced by a lightweight video camera (see, e.g., the description above of the microscope 100 and the video camera 140 and associated display device of the microscope 100). Further, the stage of a probe station microscope can be eliminated from a microscope according to the invention, since the portability enabled by the light weight and small size of a microscope according to the invention, and/or the flexible positioning of the microscope objective lenses which can be enabled by the provision of structure of the microscope and/or a tripod that enables an objective lens to be positioned proximate to a specimen to be observed with the microscope, eliminates the need to provide apparatus (e.g., the stage of a probe station microscope) for supporting the specimen during observation with the microscope (i.e., a microscope according to the invention enables the microscope to be brought to the specimen, rather than the specimen being brought to the microscope). Illustratively, the microscope 100 described above with respect to FIGS. 1 and 2 can be implemented so that the weight of the microscope 100 (i.e., not including the tripod 200 illustrated in FIG. 2) is approximately 3 to 6 pounds.

As indicated above, the light weight and small size of a microscope according to the invention enables the microscope to be portable. In particular, a microscope according to the invention can be made sufficiently small and lightweight to enable the microscope to be easily transported to a location of a specimen to be observed with the microscope. (A microscope according to the invention can, for example, be made sufficiently small and lightweight to enable the microscope to be transported as carry-on luggage on an airplane.) This can be particularly advantageous when the location of the specimen is geographically remote (e.g., in another city, state or country) from the "home" location of the microscope. In contrast, previous microscopic liquid crystal analysis of semiconductor devices has been performed using large, bulky microscopes that cannot be moved easily or at all, so that the performance of such analysis has necessitated that semiconductor devices be transported to the location of the microscope. The portability of a microscope according to the invention can be advantageous, for example, in using a microscope according to the invention for microscopic liquid crystal analysis of a semiconductor device, since the microscope can be taken to the location of the semiconductor device to enable the analysis to be performed during operation of a system of which the semiconductor device is part (e.g., to analyze operation of a semiconductor chip connected to a printed circuit board with other electronic components). This can facilitate reproduction of a problem that instigated the analysis of the semiconductor device. This can also enhance the ability to test solutions to problems with operation of the semiconductor device.

As discussed above, another advantageous characteristic of the invention is that a microscope according to the invention and/or a tripod that is used with the microscope can be implemented to provide objective lens position control capability (with any number of translational and/or rotational degrees of freedom). Consequently, it is not necessary to provide a movable stage for mounting the specimen: rather than moving the specimen so that the specimen is correctly positioned with respect to the microscope, the invention can enable the objective lens to be moved to achieve such position while the specimen remains in a fixed position. Thus, a specimen can be observed while positioned in the environment in which the specimen normally exists. For example, when a microscope according to the invention is used for microscopic liquid crystal analysis of a semiconductor device, the semiconductor device can be left in the electronic system of which the semiconductor device is part during the analysis, thus enhancing the ability to diagnose a problem with the operation of the semiconductor device and/or test solutions to a problem that is identified.

A microscope according to the invention can also include structure (e.g., the bellows 130, bellows slide 131, bellows slide bars 101c and bellows slide location control knobs 132 of the microscope 100) for providing zoom capability that is small and lightweight. In particular, a microscope according to the invention can include structure for providing zoom capability that is much smaller and lighter than that of microscopes previously used for microscopic liquid crystal analysis of semiconductor devices. For example, the bellows apparatus of a microscope according to the invention can be implemented to weigh about six ounces. In contrast, as discussed above, the steel tube and associated apparatus that can be used in the zoom apparatus of previous microscopes can weigh about 3 pounds.

Further, the use of bellows apparatus to move a video camera or microscope eyepiece to effect zooming of a microscope objective lens, in accordance with the invention, can advantageously enable a greater range of magnifications than has been enabled in previous microscopes. For example, in one embodiment, a microscope according to the invention is implemented to enable zooming from a lowest magnification of an objective lens of the microscope to a highest magnification that is five times the lowest magnification. In another embodiment, a microscope according to the invention is implemented to enable zooming from a lowest magnification of an objective lens of the microscope to a highest magnification that is ten times the lowest magnification. For example, in the latter case, when a microscope according to the invention includes four objective lenses (see, e.g., FIGS. 1 and 2, described above), the microscope according to the invention can enable a continuous range of magnification from a lowest magnification (e.g., a magnification of 0.1×) to a highest magnification that is 10,000 times the lowest magnification (e.g., a magnification of 1000×). Such a wide range of continuous zooming can be particularly advantageous when performing microscopic liquid crystal analysis of a semiconductor device. Previously, zooming has not typically been used in performing microscopic liquid crystal analysis of a semiconductor device. A microscope according to the invention can enable continuous zooming to view features on a semiconductor device having a characteristic dimension of 0.5 or 1 micron.

Still another advantage of using bellows apparatus to effect zooming of a microscope objective lens, in accordance with the invention, is that use of the bellows apparatus enables elimination of a zoom lens, as used in previous microscope zooming apparatus. A zoom lens can produce optical distortion. The use of a bellows apparatus thus eliminates that potential source of optical distortion.

Figure 3:
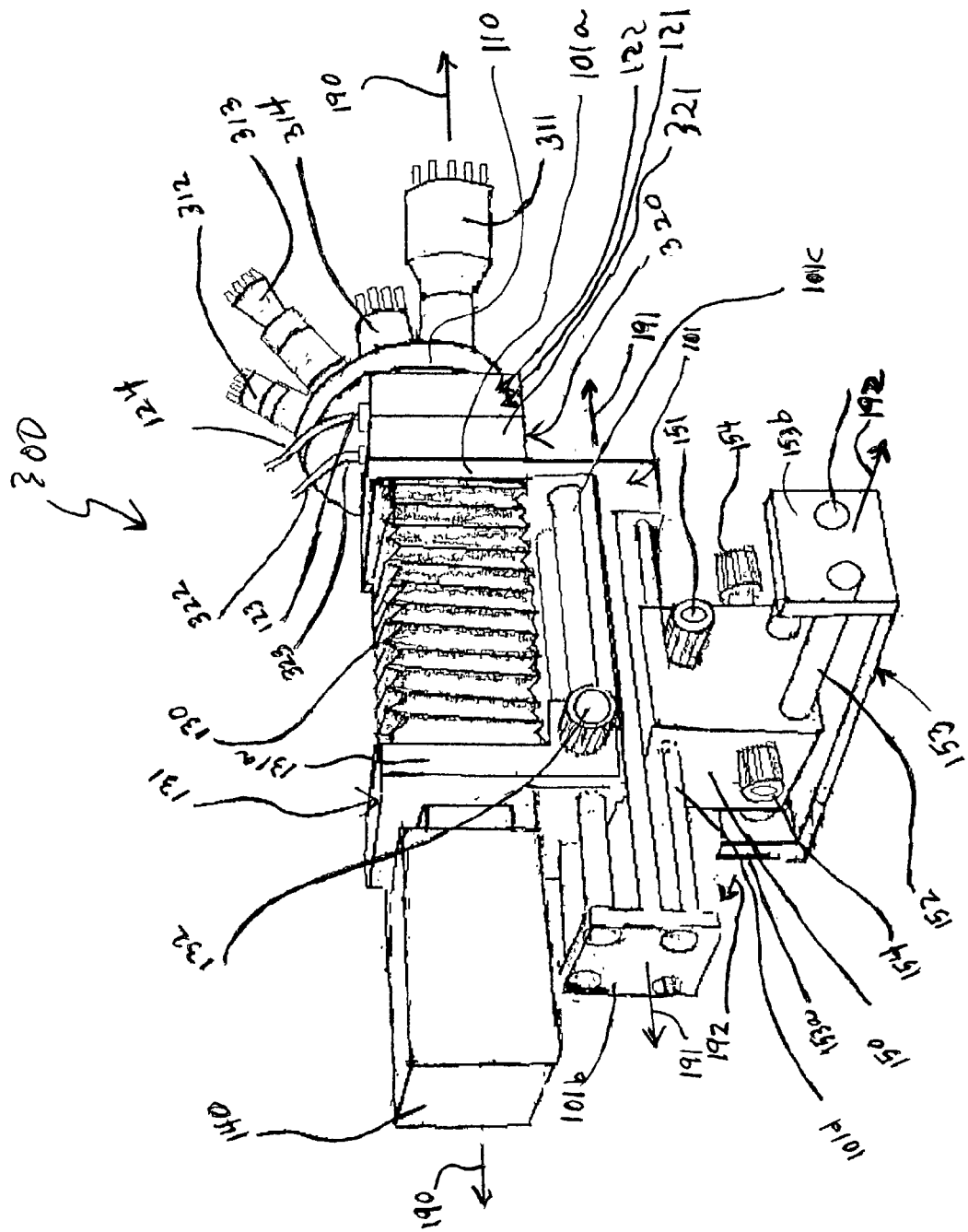
FIG. 3 is a perspective view of a hot gas microscope according to another embodiment of the invention.
Figure 4:
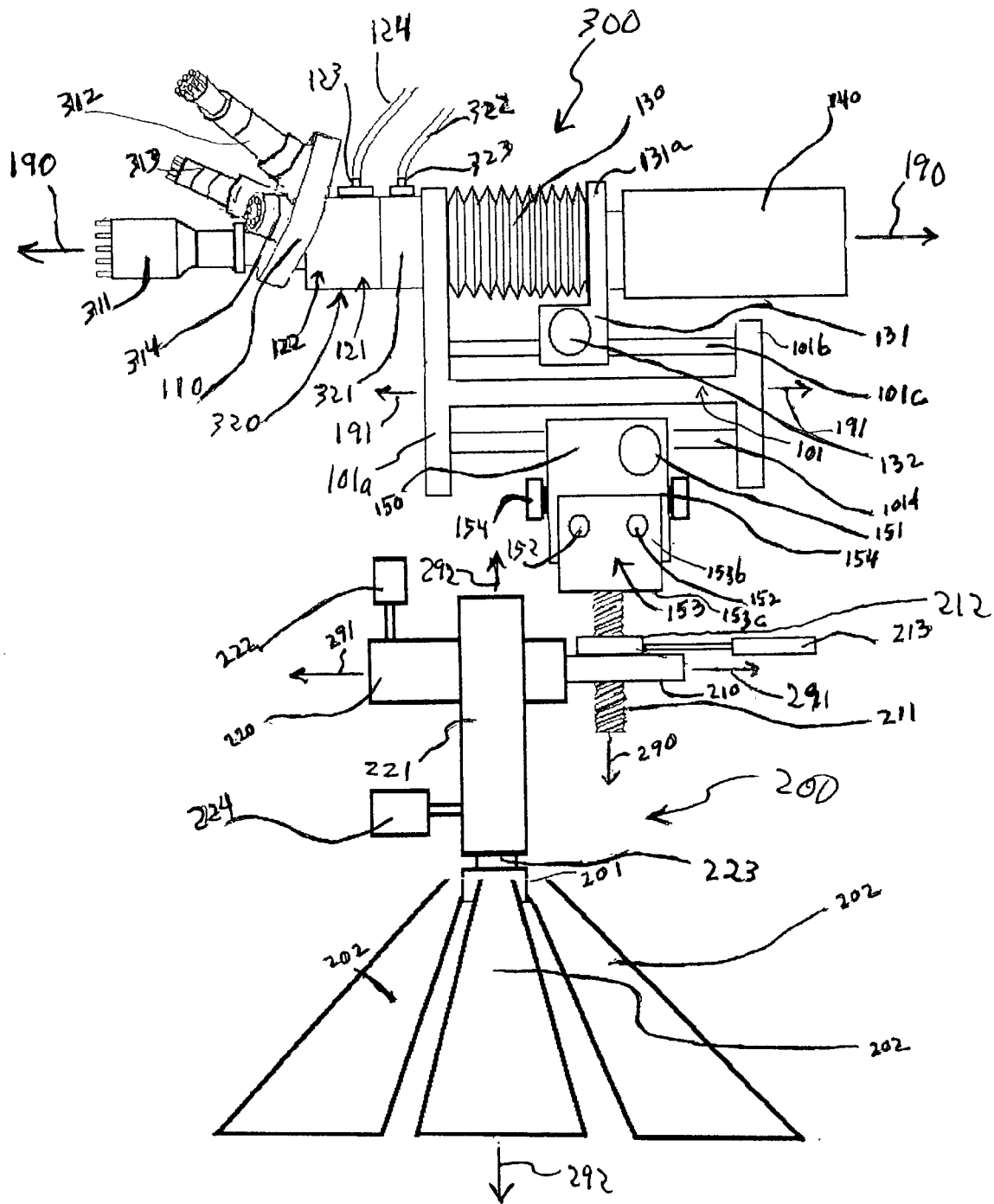
FIG. 4 is a side view of the hot gas microscope of FIG. 3 mounted on a tripod.

FIG. 3 is a perspective view of a microscope 300 according to another embodiment of the invention. FIG. 4 is a side view of the microscope 300 of FIG. 3 mounted on the tripod 200, showing the side of the microscope 300 opposite that shown in FIG. 1. The microscope 300 is modified, as compared to the microscope 100 described above, to enable a hot gas (i.e., a gas having a temperature above an ambient temperature) to be ejected from the microscope 300 to heat a specimen being observed with the microscope 300. (A microscope according to the invention including apparatus for enabling a hot gas to be ejected from the microscope is sometimes referred to herein as a "hot gas microscope" according to the invention.) Common components of the microscopes 100 and 300 are designated in FIGS. 1–4 by the same numerals. To the extent that the components of the microscope 300 are constructed and operate in the same manner as described above with respect to the microscope 100, those components are not further described below.

The microscope 300 includes a housing 320. Like the housing 120 of the microscope 100, the housing 320 of the microscope 300 houses optical apparatus of the microscope 300 (e.g., beam splitter, polarizing filter). However, the housing 320 also includes a hot gas plenum 321. A hot gas pipe connector 323 attached to the hot gas plenum 321 of the housing 320 connects a hot gas pipe 322 to the hot gas plenum 321 so that a hot gas can be delivered under pressure from a hot gas source (any of a variety of appropriate sources of hot gas can be used, as known to those skilled in the art) through the hot gas pipe 322 into the hot gas plenum 321. Four objective lenses 311, 312, 313 and 314 are mounted on the turret 110. (As with the microscope 100 and microscopes according to other embodiments of the invention, the microscope 300 can include any number, type and combination of objective lenses. For example, the objective lenses 311, 312, 313 and 314 can be a 10× magnification objective lens, a 50× magnification objective lens, a 100× magnification objective lens, and a wide angle objective lens, respectively.) As described in more detail below with respect to FIG. 5, the objective lenses 311, 312, 313 and 314 include gas outlet ports. The hot gas is forced by the gas delivery pressure through the housing 320 to the turret 110, where the hot gas exits through the gas outlet ports on to a specimen being observed with the microscope 300.

Figure 5:
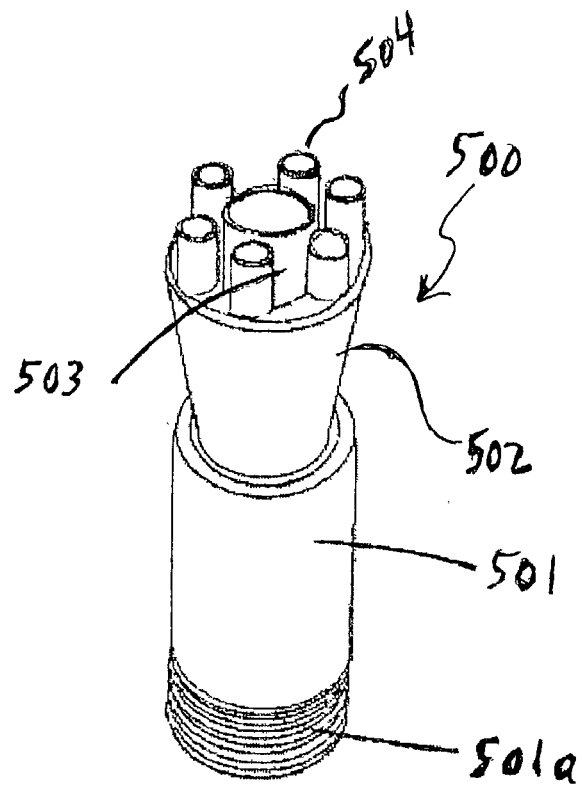
FIG. 5 is a perspective view of an embodiment of an objective lens for use in the hot gas microscope according to the embodiment of the invention illustrated in FIGS. 3 and 4.

FIG. 5 is a perspective view of an objective lens 500 according to the invention for use in a hot gas microscope according to the invention (such as the microscope 300 of FIGS. 3 and 4). With appropriate implementation of the optical characteristics, the objective lens 500 can be used to embody any of the objective lenses 311, 312, 313 and 314 of the microscope 300.

The objective lens 500 includes a base 501 having a threaded section 501a formed at one end. An end of a lens support 502 is attached to, or formed integrally with, the end of the base 501 opposite that at which the threaded section 501a is formed. A lens 503 is attached to the end of the lens support 502 opposite that attached to, or formed integrally with, the base 501. The lens 503 can be implemented to have any desired optical characteristics. Six gas outlet ports 504 extend from the end of the lens support 502 to which the lens 503 is attached and encircle the lens 503. Though the objective lens 500 is illustrated with six gas outlet ports 504, an objective lens according to the invention through which hot gas is ejected on to a specimen can have any number of gas outlet ports that can be arranged in any manner. The base 501 and lens support 502 are hollow. The hot gas flows through the base 501 and lens support 502 to the gas outlet ports 504 from which the gas is ejected on to the specimen being observed with the hot gas microscope according to the invention.

Figure 6:
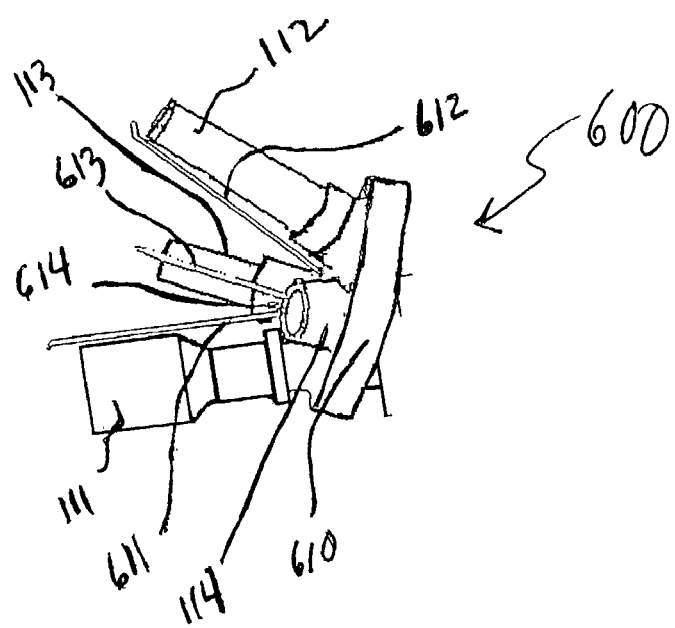
FIG. 6 is a side view of a turret and lens assembly, according to another embodiment of the invention, for use in a hot gas microscope according to the invention.

FIG. 6 is a side view of a turret and lens assembly 600, according to another embodiment of the invention, for use in a hot gas microscope according to the invention. The turret and lens assembly 600 can be used, for example, as a replacement for the turret 110 and objective lenses 311, 312, 313 and 314 of the microscope 300. The turret and lens assembly 600 can be constructed by attaching the objective lenses 111, 112, 113 and 114 of the microscope 100 to a turret 610 that can be constructed by forming holes through the turret 110 of the microscope 100, and attaching gas outlet pipes 611, 612, 613 and 614 to corresponding holes in the turret 610 so that gas from inside the housing of the microscope (e.g., the housing 120 of the microscope 100) can be ejected on to a specimen being observed with the microscope. The holes are positioned in the turret 610 so that the gas outlet pipes 611, 612, 613 and 614 extend adjacent to a corresponding one of the objective lenses 111, 112, 113 and 114. The end of each of the gas outlet pipes 611, 612, 613 and 614 proximate to the lens of the corresponding one of the objective lenses 111, 112, 113 and 114 is bent toward the lens so that gas is ejected toward the specimen.

It is desirable to construct the gas outlet ports or gas outlet pipes so that the total cross-sectional area of the gas outlet ports or gas outlet pipes is the same or approximately the same for each objective lens of a hot gas microscope according to the invention. This is desirable so that, when switching from one objective lens to another, it is not necessary to adjust the gas flow rate to ensure that the total amount of gas ejected on to the specimen remains the same or approximately the same. Additionally, it can be desirable to construct the gas outlet ports or gas outlet pipes to have a length such that the gas outlet ports or gas outlet pipes are positioned, for the same zoom position, at the same or approximately the same distance from a specimen for each objective lens. This is desirable to ensure that the gas flow on to the specimen is the same or approximately the same for each objective lens.

In performing microscopic liquid crystal analysis of a semiconductor device, the sensitivity of the analysis can be enhanced by elevating the temperature of the semiconductor device. The microscope 300 (or other hot gas microscope according to the invention) enables the temperature of a semiconductor device (or other specimen) to be elevated by flowing a hot gas on to the semiconductor device during observation of the semiconductor device with the microscope 300. Apart from the hot gas apparatus, the microscope 300 can be operated in the same manner as described above for the microscope 100. During observation of a semiconductor device (or other specimen), a hot gas is transported through the hot gas pipe 322, the hot gas plenum 321 and the housing 320, and is ejected through the gas outlet ports formed in the one of the objective lenses 311, 312, 313 and 314 that is being used to observe the semiconductor device. The hot gas can be, for example, clean dry air or clean dry nitrogen. The increase in temperature of the semiconductor device (or other specimen) can be controlled by appropriately controlling the temperature and flow rate of the hot gas ejected from the gas outlet ports of the objective lens 311, 312, 313 or 314. The pressure of the hot gas can be, for example, less than or equal to about 6 psi. When a microscope according to the invention is used for microscopic liquid crystal analysis of a semiconductor device and liquid crystal compound having a color transition temperature of about 30 degrees Celsius is used, the temperature of the hot gas can be, for example, less than or equal to about 50 degrees Celsius (a higher gas temperature can be used when the color transition temperature of the liquid crystal compound is higher).

A microscope according to the invention can also be used to eject a refrigerated gas (i.e., a gas having a temperature below an ambient temperature) on to a specimen being observed with the microscope. (A microscope according to the invention including apparatus for enabling a refrigerated gas to be ejected from the microscope is sometimes referred to herein as a "refrigerated gas microscope" according to the invention.) A refrigerated gas microscope according to the invention can be constructed in the same manner as described above with respect to embodiments of a hot gas microscope according to the invention. The temperature and flow rate of the refrigerated gas can be chosen, as understood by those skilled in the art, to produce a desired amount of cooling of the specimen (which can depend on, for example, the application for which the invention is being used and/or the nature of the specimen). A refrigerated gas microscope according to the invention can be used, for example, in performing infrared analysis; in that case, the video camera 140 is embodied by an infrared camera. Ejection of a refrigerated gas on to a specimen during infrared analysis of the specimen can be useful to inhibit heating of the specimen that may otherwise impair the infrared analysis.

The microscope 300 (FIGS. 3 and 4) described above includes the apparatus of the microscope 100 (FIGS. 1 and 2) together with apparatus for enabling a hot gas to be ejected from the microscope 300 to heat a specimen being observed with the microscope 300. However, a temperature-controlled (heated or refrigerated) gas microscope according to the invention need not include all of the apparatus of the microscope 100 (e.g., need not include multiple objective lenses, a rotatable lens turret, a bellows, objective lens position control apparatus and/or a video camera). In general, a temperature-controlled gas microscope according to the invention can be embodied by any microscope (including conventional microscopes) that includes apparatus (such as that described above with respect to the microscope 300) for ejecting a temperature-controlled gas on to a specimen being observed with the microscope.

Various embodiments of the invention have been described. The descriptions are intended to be illustrative, not limitative. Thus, it will be apparent to one skilled in the art that certain modifications may be made to the invention as described herein without departing from the scope of the claims set out below.

I claim:

1. A microscope, comprising:
  an objective lens that can be positioned proximate to a specimen to be operable;
  optical apparatus for transmitting light to the specimen and for transmitting light reflected from the specimen through the objective lens when the objective lens is positioned proximate to the specimen to be operable;
  viewing apparatus for acquiring a magnified image of the specimen produced from the reflected light; and
  gas ejection apparatus for ejecting a temperature-controlled gas on to the specimen, wherein:
    the gas ejection apparatus is constructed as part of, or positioned proximate to, the objective lens, such that the gas is ejected from the vicinity of the objective lens toward the specimen; and
    the gas ejection apparatus further comprises a gas outlet port formed in the objective lens.

2. A microscope as in claim 1, wherein the gas ejection apparatus further comprises a plurality of gas outlet ports formed in the objective lens.

3. A microscope as in claim 1, further comprising a plurality of objective lenses, wherein the gas ejection apparatus further comprises a gas outlet port formed in each of a plurality of the objective lenses.

4. A microscope as in claim 3, wherein the gas ejection apparatus further comprises a plurality of gas outlet ports formed in each of a plurality of the objective lenses.

5. A microscope as in claim 4, wherein the total cross-sectional area of the gas outlet ports for each objective lens in which a plurality of gas outlet ports are formed is the same or approximately the same as the total cross-sectional area of the gas outlet ports for each other objective lens in which a plurality of gas outlet ports are formed.

6. A microscope as in claim 3, wherein the gas outlet port of each objective lens in which a gas outlet port is formed is positioned at the same or approximately the same distance from a specimen as the gas outlet port of each other objective lens in which a gas outlet port is formed, for the same position of an objective lens with respect to the specimen when that objective lens is operable.

7. A microscope as in claim 3, further comprising a rotatable turret, wherein the plurality of objective lenses are formed on, or attached to, the rotatable turret.

8. A microscope as in claim 1, wherein the temperature-controlled gas is heated.

9. A microscope as in claim 1, wherein the temperature-controlled gas is refrigerated.

10. A microscope as in claim 1, further comprising objective lens position control apparatus.

11. A microscope, comprising:
  a plurality of objective lenses that can each be positioned proximate to a specimen to be operable;
  optical apparatus for transmitting light to the specimen and for transmitting light reflected from the specimen through an operable one of the plurality of objective, lenses;
  viewing apparatus for acquiring a magnified image of the specimen produced from the reflected light; and
  gas ejection apparatus for ejecting a temperature-controlled gas on to the specimen, wherein;
    the gas ejection apparatus is constructed as part of, or positioned proximate to, the objective lens, such that the gas is ejected from the vicinity of the objective lens toward the specimen; and
    the gas ejection apparatus further comprises a plurality of gas outlet pipes, each of the plurality of gas outlet pipes positioned proximate to a corresponding one of a plurality of the objective lenses.

12. A microscope as in claim 11, wherein a plurality of gas outlet pipes are positioned proximate to each of a plurality of the objective lenses.

13. A microscope as in claim 12, wherein the total cross-sectional area of the corresponding plurality of gas outlet pipes positioned proximate to each objective lens proximate to which a plurality of gas outlet pipes are positioned is the same or approximately the same as the total cross-sectional area of the plurality of gas outlet pipes positioned proximate to each other objective lens proximate to which a plurality of gas outlet pipes are positioned.

14. A microscope as in claim 11, wherein the gas outlet pipe positioned proximate to each objective lens proximate to which a gas outlet pipe is positioned is at the same or approximately the same distance from a specimen as the gas outlet pipe positioned proximate to each other objective lens proximate to which a gas outlet pipe is positioned, for the same position of an objective lens with respect to the specimen when that objective lens is operable.

15. A microscope as in claim 11, further comprising a rotatable turret, wherein the plurality of objective lenses are formed on, or attached to, the rotatable turret.

16. A microscope as in claim 9, wherein the viewing apparatus comprises an infrared camera.

17. A microscope as in claim 10, wherein the objective lens position control apparatus further comprises objective lens translational position control apparatus.

18. A microscope as in claim 10, wherein the objective lens position control apparatus further comprises objective lens rotational position control apparatus.

19. A microscope as in claim 11, wherein the temperature-controlled gas is heated.

20. A microscope as in claim 11, wherein the temperature-controlled gas ie refrigerated.

21. A microscope as in claim 11, further comprising objective lens position control apparatus.

* * * * *